(No Model.)
J. U. BECKEMAN & D. W. LUKENS.
BRIDLE BIT.
No. 480,487. Patented Aug. 9, 1892.
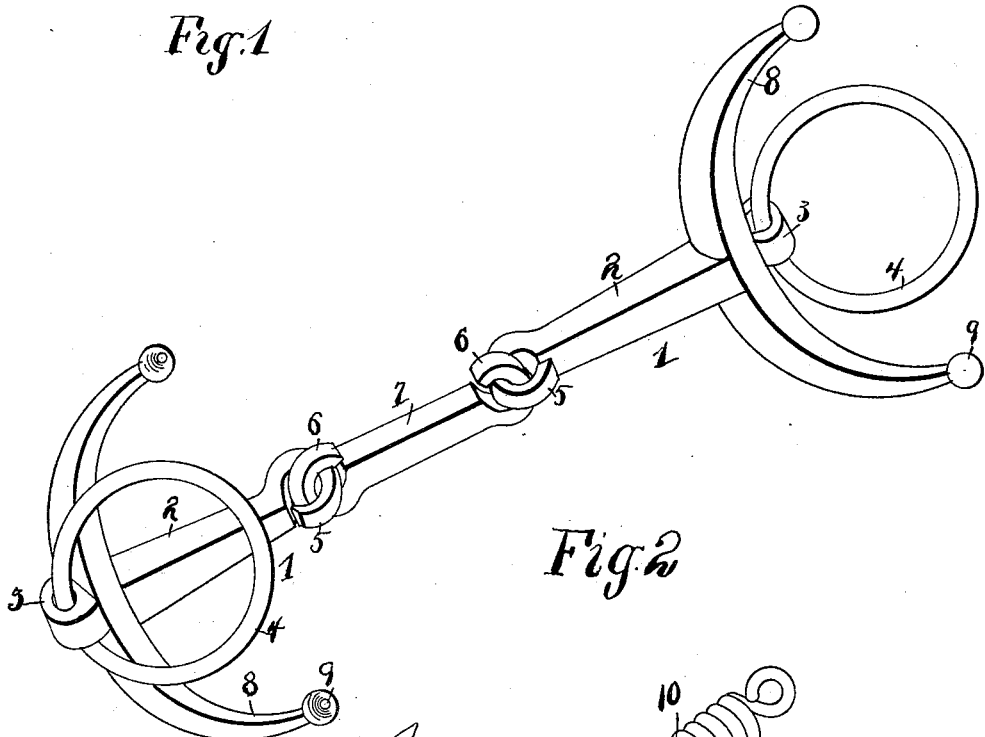
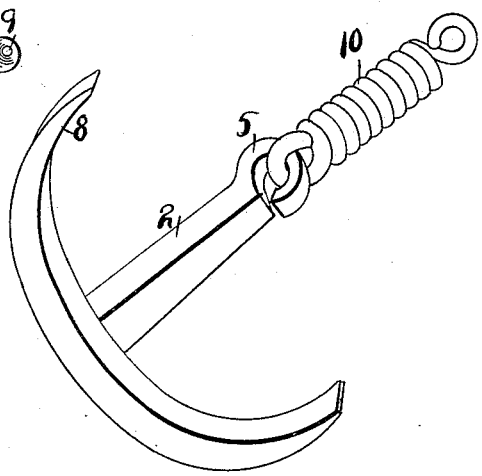
Witnesses
A. A. Eichs
C. H. Keller
John U. Beckeman
David W. Lukens
Inventors
By their Attorneys Higdon & Higdon

UNITED STATES PATENT OFFICE.

JOHN U. BECKEMAN AND DAVID W. LUKENS, OF ST. LOUIS, MISSOURI.

BRIDLE-BIT.

SPECIFICATION forming part of Letters Patent No. 480,487, dated August 9, 1892.

Application filed November 30, 1891. Serial No. 413,537. (No model.)

*To all whom it may concern:*

Be it known that we, JOHN U. BECKEMAN and DAVID W. LUKENS, of the city of St. Louis and State of Missouri, have invented certain new and useful Improvements in Bridle-Bits, of which the following is a full, clear, and exact description, reference being had to the accompanying drawings, forming a part hereof.

Our invention relates to improvements in bridle-bits; and it consists in the novel arrangement and combination of parts, as will be more fully hereinafter described, and designated in the claims.

In the drawings, Figure 1 is a perspective view of our complete invention, and Fig. 2 is a perspective view of a modification of our invention.

Referring to the drawings, 1 1 represent two sections of the bit, which are similarly constructed, each of which consists of short bars 2, which portions come in contact with the mouth of the horse or animal to which it may be applied.

3 3 represent two eyes, which are formed at one end of the bars 2 or an enlarged portion thereof, through which eyes the ordinary bit-rings 4 are inserted and adapted to move or loosely fit therein. At the tapering ends of the bars 2 are also formed eyes 5, through which the end 6 of the link 7 is adapted to pass, uniting the two sections of the bit. Adjacent to the eyes 3 and formed integral with the bars 2 are substantially U-shaped clamping-jaws 8, the ends of which jaws are provided with balls 9, which balls come in contact with the jaws of the horse or other animal when the bit is in use in driving. When sufficient strength is applied to the reins, and consequently the bit-rings 4, the balls 9 will be brought in contact with the jaws of the horse.

By the use of the link 7, as shown and described, the ends of the U-shaped bars or the balls 9 will be brought in direct contact with the jaws of the animal, and consequently the said link is absolutely necessary in the true workings of the bit.

In Fig. 2 we have shown a modification of our invention, in which we dispense with the balls 9 and sharpen the ends of the U-shaped jaws 3, which points when brought in contact with the jaws of the animal will have a better effect and would only be used in cases of necessity upon an unmanageable animal. In Fig. 2 we have also shown a further modification in which we have substituted for the link 7 a coil-spring 10, the ends of which are passed through the eyes 5, formed in the bars 2, and fastened there in any mechanical manner. In this instance when draft is applied to the rings 4 the spring 10 will slightly relax and give perfect ease to the mouth of the horse and yet allow the ends of the U-shaped jaws to be brought in contact with the jaws of the animal.

Our invention can be advantageously applied to animals of an uncontrollable nature, and to this use our invention is especially applicable.

Having fully described our invention, what we claim is—

1. A bridle-bit consisting of bars 2, eyes 3 and 5, formed on each end of the same, U-shaped bars formed integrally with the said bars 2, a link connecting the eyes 5 of the said bars 2, and bit-rings 4, carried by the eyes 3, substantially as set forth.

2. A bridle-bit consisting of bars 2, eyes 3 and 5, formed on each end of the same, U-shaped bars formed integrally with the said bars 2, a link, such as 7, passing through the eyes 5 of the said bars 2, and bit-rings 4, carried by the eyes 3, substantially as set forth.

In testimony whereof we affix our signatures in presence of two witnesses.

JOHN U. BECKEMAN.
DAVID W. LUKENS.

Witnesses:
ED. E. LONGAN,
C. F. KELLER.